Nov. 17, 1959   G. E. HOLMES   2,913,131
LIFTING AND TOWING SLING HITCH FOR VEHICLES
Filed Feb. 21, 1958   4 Sheets-Sheet 1

INVENTOR
GERALD E. HOLMES
BY
Lamont Johnston
ATTORNEY

Nov. 17, 1959  G. E. HOLMES  2,913,131
LIFTING AND TOWING SLING HITCH FOR VEHICLES
Filed Feb. 21, 1958  4 Sheets-Sheet 2

INVENTOR
GERALD E. HOLMES
BY
*Lamont Johnston*
ATTORNEY

Nov. 17, 1959  G. E. HOLMES  2,913,131
LIFTING AND TOWING SLING HITCH FOR VEHICLES
Filed Feb. 21, 1958  4 Sheets-Sheet 3

INVENTOR
GERALD E. HOLMES
BY
*Lamont Johnston*
ATTORNEY

Nov. 17, 1959     G. E. HOLMES     2,913,131
LIFTING AND TOWING SLING HITCH FOR VEHICLES
Filed Feb. 21, 1958     4 Sheets-Sheet 4

INVENTOR
GERALD E. HOLMES
BY
*Lamont Johnston*
ATTORNEY ing by means of spurs hooked into holes in the frame members of the automobile, to connect the anchor bar with the vehicle, the anchor bar being located below and inside the bumper and the fabric straps extending around and upwardly from the pumper;

United States Patent Office
2,913,131
Patented Nov. 17, 1959

2,913,131

LIFTING AND TOWING SLING HITCH FOR VEHICLES

Gerald E. Holmes, Chattanooga, Tenn., assignor to Ernest Holmes Company, Chattanooga, Tenn., a corporation of Tennessee Application February 21, 1958, Serial No. 716,808

6 Claims. (Cl. 214—86)

This invention relates to a sling hitch for lifting and towing one end of a vehicle.

Present-day automobiles are being made with more delicate pumpers, some of which are split, and with exposed body panels, such as splash panels or under-panels, with the result that it is becoming more and more difficult to lift one end of a car without damaging the bumper or grill work. Thus, when a car is disabled on a street from which it must be removed, with present-day equipment, the damage done to a car in towing it frequently exceeds by a substantial amount the damage causing the disablement.

One object of this invention is to provide a hitch for lifting one end of a vehicle which includes at least one elongated flexible means for supporting the weight of the vehicle.

Another object is to provide such a hitch which includes means for separating the vehicle from a towing truck.

A further object is to provide a hitch for towing a vehicle from a wrecker truck which comprises at least one elongated flexible means for supporting the weight of the vehicle and a pair of telescoping spacer bars projecting rearwardly from spaced points on a towing truck, to which they are universally pivoted, means being provided for automatically locking the telescoping bars in retracted positions during towing.

Still another object is to provide a hitch for lifting or towing one end of a vehicle which comprises at least one fabric strap, for supporting the weight of the vehicle in such a manner as not to damage it in any way, fastened to an anchor bar, which in turn is attached to the vehicle by one or more elongated flexible means.

Other objects and advantages of the invention will be apparent from the following description, taken in connection with the accompanying drawings, in which:

Fig. 1 is a perspective view showing one embodiment of the invention, used in lifting one end of a vehicle in a shop or garage, the lifting being accomplished through two fabric straps attached to an anchor bar, which in turn is attached by a pair of chains and hooks around the front frame members of an automobile, the chains being passed loosely from the anchor bar up to and attached to a lifter bar as a safety precaution;

Figure 3:
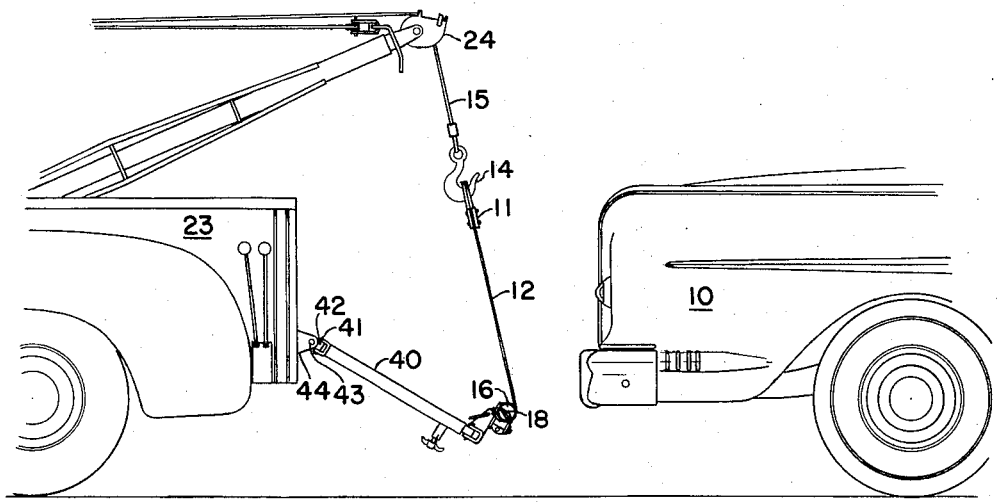
Fig. 3 is a side elevation showing the hitch in position to be attached to the rear end of an automobile, with the spacer bar plungers pulled and held outwardly, to permit extension of the telescoping spacer bars for making an attachment under the automobile.
Figure 4:
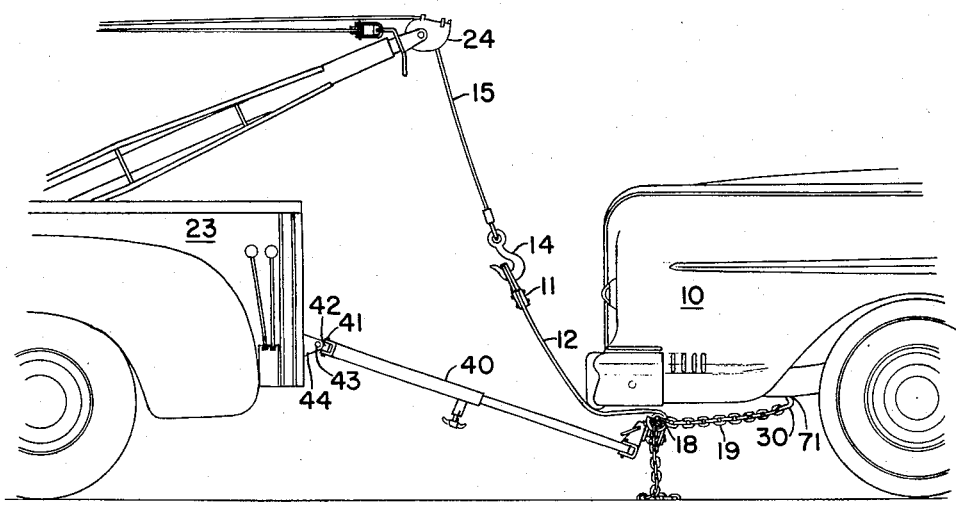
Figure 5:
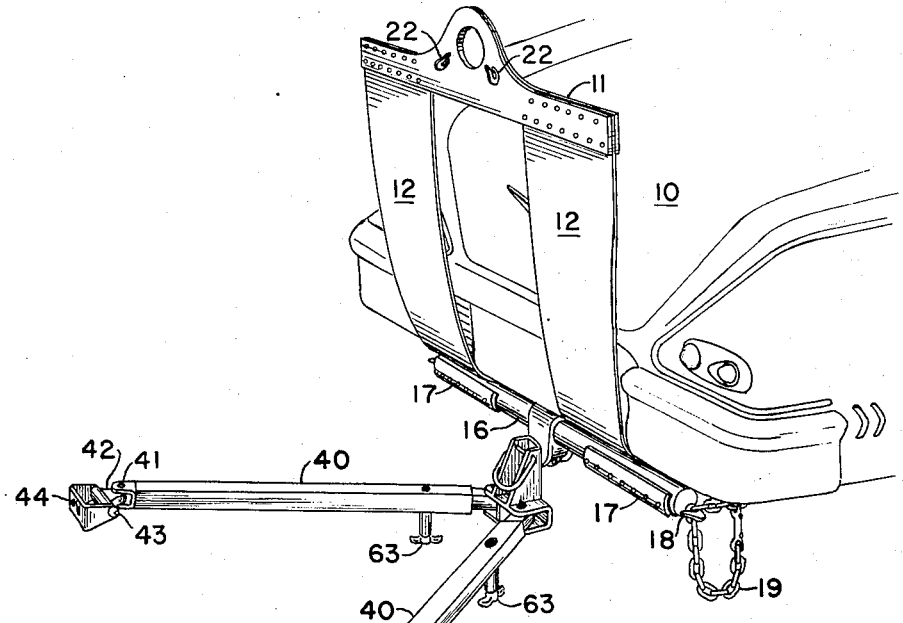
Figure 5:
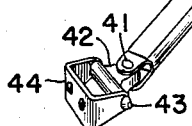
Figure 8:
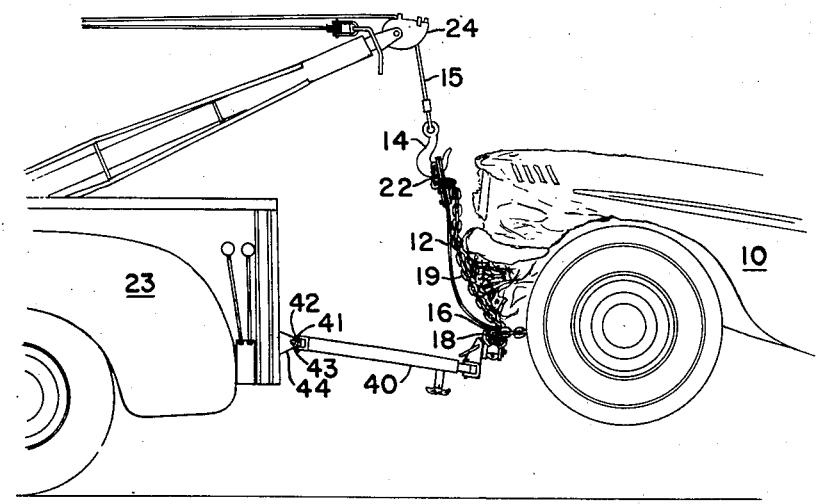
Figure 6:
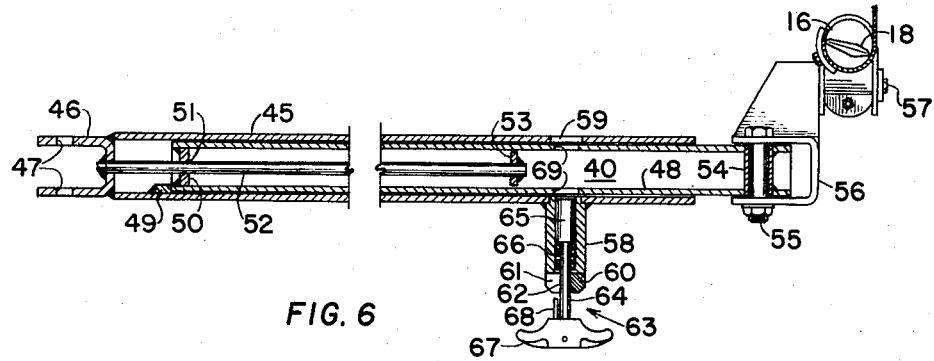
Figure 7:
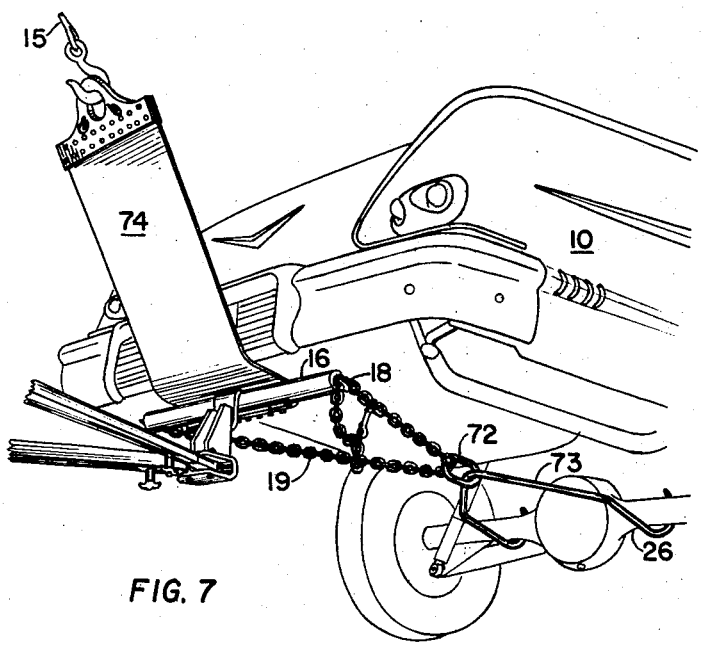

Fig. 4 is a side elevation similar to Fig. 3, with the telescoping bars fully extended and the chains attached, Fig. 5 is a perspective view of the hitch as connected in Fig. 4 while in use, showing the telescoping spacer bars in retracted positions, with the plungers locking the telescoping bars in retracted positions and the rear end of the automobile lifted by the hitch and held in position for towing;

Fig. 6 is an enlarged cross sectional view of one of the telescoping spacer bars, showing the manner of attaching it to the anchor bar and also showing the spacer bar plunger;

Fig. 7 is a perspective view showing a modification of the invention in which only one fabric strap is used in the center, a single chain is looped between the ends of the anchor bar and a double hook is connected between the chain loop and the rear axle housing of an automobile; and Fig. 8 is a side elevation of a modified manner of using the hitch for lifting and towing a damaged automobile.

Figure 1:
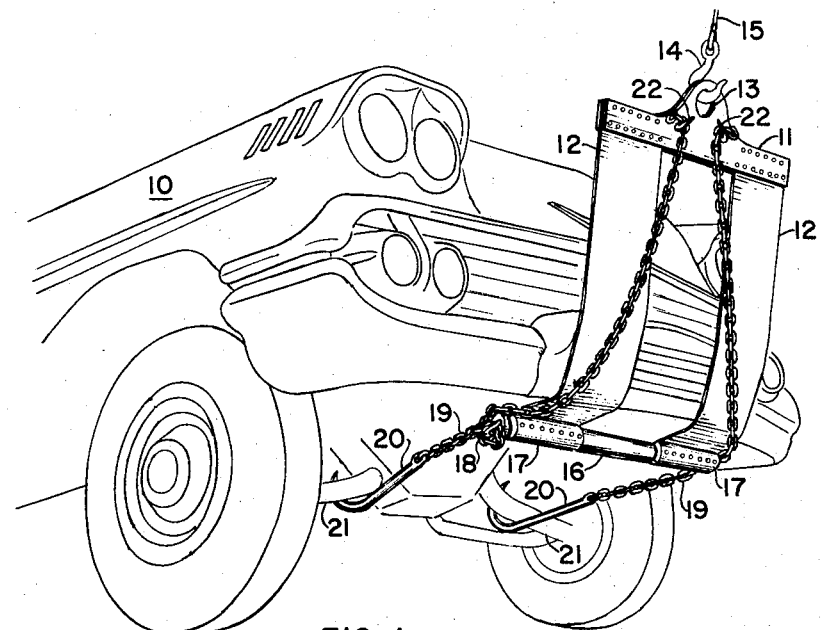

In the drawings, the numeral 10 designates an automobile or other vehicle to be lifted or towed, Fig. 1 showing one embodiment of the invention intended for use in lifting one end of a vehicle in a shop or a garage. The device comprises essentially a lifter bar 11 to which are attached one or more straps or bands 12 of a suitable fabric. These straps are preferably constructed of a high strength, durable, webbed cotton belting which may, if desired, be impregnated and covered with an abrasion resistant protective coating. The straps, bands, or slings 12 may also be made of other material of substantial width, such as leather, plastics, synthetic resins, or rubber covered flexible wire rope supporting a cushioning pad, which are all equivalent to fabric for such use. Such materials are all pliant, supple or limber. The lifter bar 11 may be constructed of mating plates between which the upper ends of the fabric straps 12 are secured, as by bolting the plates together. An eye or opening 13 is formed in the upper part of the lifter bar for engagement by a hook 14 attached to the end of a lifting wire cable, chain or other flexible lifting means 15, which is supported from a suitable hoist drum or pulley, not shown.

The lower ends of the fabric straps 12 are securely fastened to an anchor bar 16, as by means of an arcuate plate 17 bolted to the anchor bar. At each end of the anchor bar, a grab hook 18 is provided, which will hold securely any link of a chain 19 which is passed into the grab hook. As illustrated in Fig. 1, the chain 19 has at one end a hook 20 designed to be attached to the front end of an automobile by hooking around the rear lower suspension arms 21 on each side of the automobile. It will be apparent that the weight of the car is thus cradled and supported on the fabric straps 12. Caution should be observed so as not to accidentially hook onto tie-rods or other steering linkage.

As a safety precaution, to provide for the possibility of breakage of one of the fabric straps 12 when the straps become worn or damaged or receive an unduly severe jolt, the free ends of the chains 19 may be wrapped once around the ends of the anchor bar 16, passed upward underneath loosely but closely adjacent to the fabric straps and hooked into grab hooks 22 attached to the lifter bar 11, as shown in Fig. 1. The chains 19 do not normally support the weight of the automobile, which is carried by the fabric straps 12, but are merely connected loosely as a safety precaution.

Figure 2:
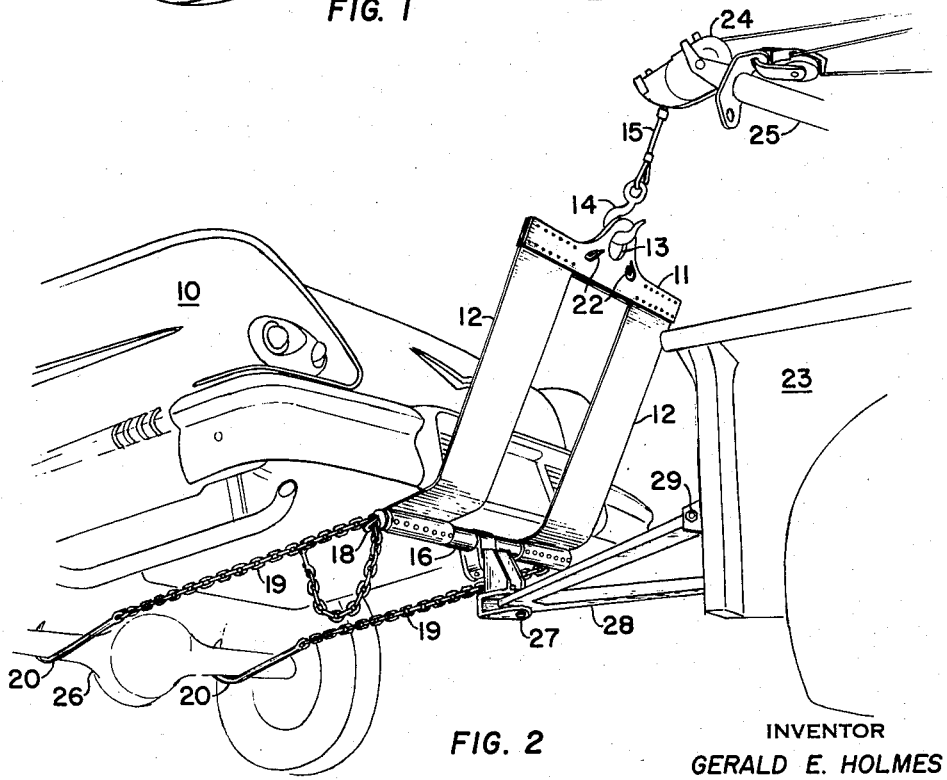
Fig. 2 is a perspective view similar to Fig. 1, but showing a wrecking truck picking up the rear end of a car with a pair of fabric straps connected to an anchor bar, which is pivotally connected to a bracket hinged on the truck and which is also connected through a pair of chains and hooks around the rear axle housing of the vehicle.

In Fig. 2, there is shown a wrecking truck 23 supporting, by means of a pulley 24 on the outer end of a boom 25, the cable 15 which, as in Fig. 1, supports the lifter bar 11, the fabric straps 12 and the anchor bar 16. The anchor bar is attached by means of the chains 19 and the hooks 20 around the rear axle housing 26 of an automobile, each chain being attached at the appropriate distance from the rear axle housing 26 in one of the grab hooks 18 at each end of the anchor bar 16. If the gas tank is close to the rear bumper of the car, it is generally better to make the hook-up so that the anchor bar is under the rear of the tank, even though the tank rests on it. If the tank is well forward of the rear bumper, the anchor bar should be positioned between the bumper and the tank. Sometimes, the chains will bear up against the gas tank, but the vertical force is so small that no damage should result.

The anchor bar is pivotally attached, as by means of a vertical pivot pin 27, to a bracket 28 which is hinged at 29 to the wrecking truck 23 for vertical movement. The bracket 28 serves as a means for spacing the car from the truck while the car is being towed.

In Figs. 3, 4 and 5, there is shown another embodiment of the invention in which the means for spacing the towed vehicle from the towing truck consists of a pair of bars 40, which telescope outwardly to facilitate attachment to the vehicle. Each of these bars is universally pivoted to the towing truck 23 at a point spaced from the other bar, as through a vertical pin 41, journaled in a knuckle 42 which, in turn, is pivotally connected by a horizontal pivot pin 43 journaled in a bracket 44 attached to the tail gate of the towing truck.

As illustrated clearly in Fig. 6, each of the telescoping bars 40 comprises a hollow outer sleeve 45 of square or rectangular cross section attached, as by welding, to a bracket 46 having parallel flanges containing openings 47 for the reception of the vertical pivot pin 41.

Within the outer sleeve 45, an inner sleeve or member 48 of like square or rectangular cross section is slidably received, a stop member 49 being attached, as by welding, to the inner surface of the outer sleeve 45 to limit the inner movement of the inner sleeve 48. At the inner end of the inner sleeve 48, a stop disc 50 is provided, this disc being attached to the inner sleeve 48, as by welding. An opening 51 is provided in the stop disc 50 to permit the passage therethrough of a guide rod or limit member 52 whose inner end is attached, as by welding, to the bracket 46. To the outer end of the limit member 52 there is attached, as by welding, a stop disc 53, adapted to engage the stop disc 50 and thereby to limit the outward movement of the inner sleeve 48. At the outer end of the inner sleeve 48, there is formed an opening or journal 54 for receiving a pivot bolt 55, by means of which the telescoping bar 40 is pivotally attached to a swivel block assembly 56. The swivel block assembly 56 is pivotally attached by means of a swivel pin 57 to the anchor bar 16.

Near the outer end of the outer sleeve 45, beyond the outer position of the stop disc 53, there is located a plunger stud or knob 58 and, aligned therewith on the opposite side of the outer sleeve, an opening 59. A cap 60 is secured to the outer end of the plunger knob 58 and has a slot 61 therein, as well as a central opening 62. A plunger 63, having a shank 64 slidably received in the opening 62 in the cap 60 and an enlarged pin 65 at its inner end, includes between the enlarged pin 65 and the cap 60 a coiled spring 66. To the outer end of the plunger 63, there is attached a handle 67, from which a key 68 extends inwardly toward the outer sleeve 45. A pair of aligned openings 69 are provided in the inner sleeve 48. The key 68 on the handle 67 is adapted to be received in the slot 61 in the cap 60 when the plunger is to be retracted.

The operation of hooking up the device as shown in Figs. 3, 4, 5, and 6 is as follows:

With the sling hitch hanging in the approximate position shown in Fig. 3, the towing truck 23 is backed close to the bumper of the car 10 to be picked up. The spacer bar plungers 63 are pulled out and rotated so that their keys 68 will be out of engagement with the slots 61 and the keys 68 will hold the spacer bar plungers 63 in outward positions, against the compression of the coiled springs 66. This action withdraws the pins 65 from the openings 69 in the inner sleeves 48 and permits the inner sleeves 48 to be pulled outwardly relative to the outer sleeves 45 and rearwardly from the truck. The spacer bars 40 are next lowered to the ground and lowering of the lifter bar 11 and the fabric straps 12 is continued until the fabric straps 12 are slack. Then, the anchor bar 16 is slid about 6 inches under the end of the car, the spacer bars 40 extending themselves accordingly, as required, thereby greatly facilitating attachment to the car. Each of the short spurs 30 provided on the ends of the chains 19 may then be hooked into one of the convenient holes 71 provided in the frames or cross members of some cars. As shown in Fig. 4, the chains 19 are pulled taut and each is fastened with the proper link in each of the grab hooks 18, so that the anchor bar 16 will be approximately parallel to the bumper of the car. Then, the handles 67 of the plungers 63 are rotated until the keys 68 drop into the slots 61, due to the force of the coiled springs 66. Finally, through a power take-off attachment, not shown, the cable 15 is raised over the pulley 24 on the truck 23 and the fabric straps 12 are guided manually into their desired positions on the bumper of the car 10. Where tailpipes or extensions protrude past the rear bumper and interfere with the normal locations of the straps 12, the straps may be slid to the side that will give the least off-center loading. Hoisting on the cable 15 is continued until the car is lifted to the desired height, preferably not higher than a position in which the spacer bars 40 are horizontal.

In raising the car, the spacer bars 40 will automatically telescope into their short positions and lock, as shown in Fig. 5. This is accomplished by the action of the inner sleeves 48 sliding inwardly with respect to the outer sleeves 45 until the openings 69 in the inner sleeves are in alignment with the pins 65 of the plungers 63, whereupon the coiled springs 66 will force the pins 65 into the openings 69 and will lock the inner sleeves 48 in position. The loose ends of the chains may be supported and kept from dragging by attaching them with double snap hooks to the taut portions of the chains, as shown, by hooking the hooks 20 over the adjacent ends of the spacer bars 40, or by other suitable means.

In the modification illustrated in Fig. 7, only a single chain 19 is used, forming a loop, with the chain attached near its ends in the grab hooks 18 at each end of the anchor bar 16. A ring 72 is held at the center of the looped chain 19 and to the ring is attached a double hook 73, which affords a convenient means for hooking onto the rear axle housing 26 of an automobile.

Also as illustrated in Fig. 7, another modification of the invention is that only one strap 74 may be used, in place of the double straps 12, as illustrated in the other figures. A single strap 74 may be conveniently used when there is no license plate bracket or other relatively fragile member located at or near the center of the bumper where it would be contacted by the fabric strap.

It will be understood that the manner of supporting the automobile which is illustrated in Fig. 7 can be used for lifting the automobile in a shop or garage, as described in connection with Fig. 1, as well as for towing it.

Another possible modification is that more than two fabric straps may be used, if desired.

As another modification, in place of using the hooks 20 or 73 to hook around the rear axle housing of an automobile, or the hooks 20 attached to the lower, rear suspension arms in a front-end pickup, or the short spurs 30 to hook into holes 71 in the frame members of the automobile, the chains 19 may be wrapped around rear axle housings or suspension arms and fastened upon themselves by means of grab hooks, not shown, provided, for example, on the ends of the chains opposite from the hooks 20.

Another possible modification is to use only one chain 19 and a single hook 20.

Still another modification is illustrated in Fig. 8, showing the use of the hitch in towing a damaged automobile. In such a case, as when a bumper has been knocked off or there are ragged edges of metal, the rough or sharp edges of metal are apt to cut through the fabric of the straps and render them unsafe, or at least damage them. Therefore, as illustrated, it is often best to lift and tow a damaged car by the chains 19 attached to the car in any of the manners heretofore described, hooked to the grab hooks 18 on the ends of the anchor bar 16, wrapped once around the ends of the anchor bar and extending upwardly to the lifter bar 11, to which they are attached by being hooked ino the grab hooks 22. The chains may either be passed over the top of the lifter bar before being attached to the grab hooks, as illustrated, or they may be passed between the fabric straps 12 and under the lifter bar into the grab hooks. In either case, the attachments of the chains to the grab hooks 22 will be such as to permit the straps 12 to be completely loose and free, the chains thereby carrying all of the weight.

It will be readily apparent that the manner of supporting the automobile which is illustrated in Fig. 8 can be used for lifting the automobile in a shop or garage, as described in connection with Fig. 1, as well as for towing it.

The chains 19 may be replaced, with suitable adaptations in the manner of attachment to the anchor bar 16 and/or the lifter bar 11, by wire cables or other elongated flexible means.

One of the many advantages of this invention is that, in the use of one or more fabric straps, or slings of other pliant, supple or limber material, no metal touches any of the finished parts of the car. When the sling hitch has been properly attached, only the flexible fabric straps 12 will touch the bumper or any other finished parts such as chrome or painted surfaces, and the end of the car will be cradled in these straps.

Particularly with the use of one or more fabric straps, the weight support is evenly distributed, with no excessive support on any one spot, all of the weight of the car being supported by the fabric straps. This avoids damage to any parts of the car, the weight being spread over a very large area, with no load concentration. Even very light grill work and metal paneling are seldom damaged, even though much of the load is on them. The support by means of a fabric strap is flexible, since the strap will fit or fold around various shapes, such as bumper guards, odd-shaped bumpers, grills and other irregular shapes.

Another advantage of this invention is the speed with which the sling hitch can be hooked up and a car can be picked up, which is a very important consideration on busy streets and highways. It is seldom necessary for the operator to remain on the scene of a simple tow job longer than one and one-half minutes. The initial positioning of a tow truck to a disabled car is not critical and the hook-up can be made with considerable speed. All popular 1957 and 1958 model automobiles have been towed with safety and without damage with this device.

The snap-lock, one-position plungers 63 provide a very convenient means of completing the pick-up, since the spacer bars 40 will be held in their closed, inwardly telescoped positions just as soon as they reach those positions. The telescopic spacer bars are permanently attached to the sling hitch, ready for instant use. These automatically snap into locked positions as the car is raised, properly space it from the tow truck and afford a sharp turning radius.

I claim:

1. A hitch for lifting one end of a vehicle comprising an anchor bar, elongated flexible means detachably attaching the anchor bar under the end of the vehicle, a lifter bar, and at least one relatively wide fabric strap supporting the lifted end of the vehicle connected in tension between the anchor bar and the lifter bar.

2. A hitch for towing a vehicle from a wrecker truck comprising means for spacing the vehicle from the truck, an anchor bar attached to said means, elongated flexible means attaching the anchor bar under one end of the vehicle, a lifter bar, and at least one relatively wide fabric strap supporting the lifted end of the vehicle connected in tension between the anchor bar and the lifter bar.

3. A hitch for towing a vehicle having a bumper from a wrecker truck comprising a pair of telescoping bars pivoted to the truck, means for locking the telescoping bars in closed positions, a transversely extending anchor bar connected to the outer ends of the telescoping bars, a chain connected between the lower portion of the vehicle and each end of the anchor bar, with the anchor bar substantially parallel to, and between the bumper and the adjacent axle of the vehicle, a lifter bar, and two relatively wide fabric straps supporting the lifted end of the vehicle connected in tension between the anchor bar and the lifter bar passing outwardly from the anchor bar under and in supporting contact with the bumper and upwardly to the lifter bar.

4. A hitch for lifting one end of a vehicle comprising an anchor bar, elongated flexible means attaching the anchor bar under one end of the vehicle body, a lifter bar, and at least one sling of limber material of substantial width connected between the anchor bar and the lifter bar in contact with and supporting in tension the lifted end of the vehicle.

5. A hitch for towing a vehicle from a wrecker truck comprising means pivoted on the truck for spacing the vehicle from the truck, an anchor bar attached to said means, elongated flexible means attaching the anchor bar under one end of the vehicle body, a lifter bar, and at least one sling of pliant material of substantial width connected between the anchor bar and the lifter bar in contact with and supporting in tension the lifted end of the vehicle.

6. A hitch for towing a vehicle having a bumper from a wrecker truck comprising a pair of telescoping bars pivoted to the truck, means for locking the telescoping bars in closed positions, a transversely extending anchor bar connected to the outer ends of the telescoping bars, a chain connected between the lower portion of the vehicle and each end of the anchor bar, with the anchor bar substantially parallel to and between the bumper and the adjacent axle of the vehicle, a lifter bar, and at least one sling of pliant material of substantial width supporting the lifted end of the vehicle connected in tension between the anchor bar and the lifter bar passing outwardly from the anchor bar under and in supporting contact with the lifted end of the vehicle and upwardly to the lifter bar.

References Cited in the file of this patent

UNITED STATES PATENTS

| | | |
|---|---|---|
| 2,555,663 | Schouboe | June 5, 1951 |
| 2,726,777 | Wiley | Dec. 13, 1955 |
| 2,795,435 | Ortiz et al. | June 11, 1957 |
| 2,796,183 | Cline et al. | June 18, 1957 |